United States Patent [19]

Ollendorf

[11] 4,162,701
[45] Jul. 31, 1979

[54] THERMAL CONTROL CANISTER

[75] Inventor: Stanford Ollendorf, Silver Spring, Md.

[73] Assignee: The United States of America as represented by the Administrator of the National Aeronautics and Space Administration, Washington, D.C.

[21] Appl. No.: 853,677

[22] Filed: Nov. 21, 1977

[51] Int. Cl.² .................................................. G05D 23/00
[52] U.S. Cl. ..................................... 165/32; 165/105; 244/1 R; 244/163
[58] Field of Search ................. 165/32, 105; 244/1 R, 244/163

[56] References Cited

U.S. PATENT DOCUMENTS

| | | | |
|---|---|---|---|
| 3,402,761 | 9/1968 | Swet | 244/163 |
| 3,489,203 | 1/1970 | Fischell | 244/163 |
| 3,517,730 | 6/1970 | Wyatt | 165/32 |
| 3,525,386 | 8/1970 | Grover | 165/32 |
| 3,672,443 | 6/1972 | Bienert | 165/32 |
| 3,749,156 | 7/1973 | Fletcher | 165/32 |
| 4,033,406 | 7/1977 | Basiulis | 165/105 |

*Primary Examiner*—Charles J. Myhre
*Assistant Examiner*—Carl S. Miller
*Attorney, Agent, or Firm*—Robert D. Marchant; John R. Manning; John O. Tresansky

[57] ABSTRACT

A heat dissipating instrument package of a spacecraft, located in a canister having walls in heat transfer relationship with the package, is maintained at a substantially constant temperature. Fixed conductance heat pipes on the canister walls are connected to variable conductance heat pipes, mounted on a radiator structure separated from the canister walls by a thermal blanket. The effective radiating area of the radiator structure is controlled by the variable conductance heat pipes in response to a comparison of a sensed temperature of the instrument package or the canister wall with a seat point value. The comparison controls a heater in a gas reservoir containing a non-condensable gas of the variable conductance heat pipe. To enable the set point to be varied over a relatively wide range, such a 0°-30° C., a thermal radiation shield for the gas reservoir prevents radiant energy from the exterior environment and thermal energy reflected from the spacecraft from overheating the non-condensable gas. In one embodiment, variable conductance heat pipe headers are provided between the canister and radiators, with isothermalizer feeder pipes on the radiators and canister walls; in further embodiments, variable conductance heat pipe feeder pipes are coupled directly between the canister walls and one or more radiators.

9 Claims, 9 Drawing Figures

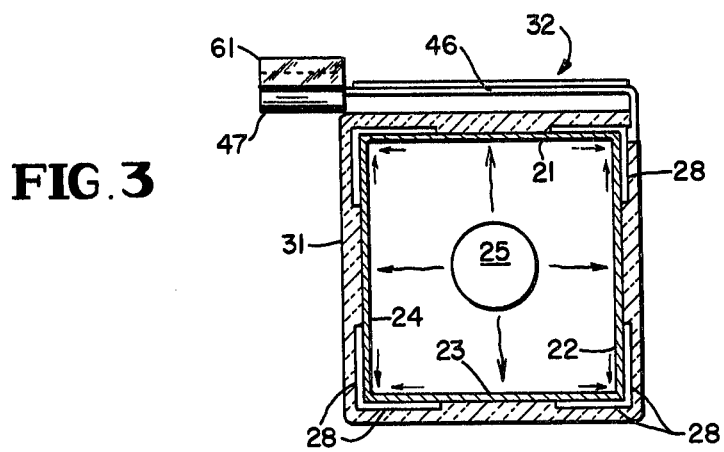
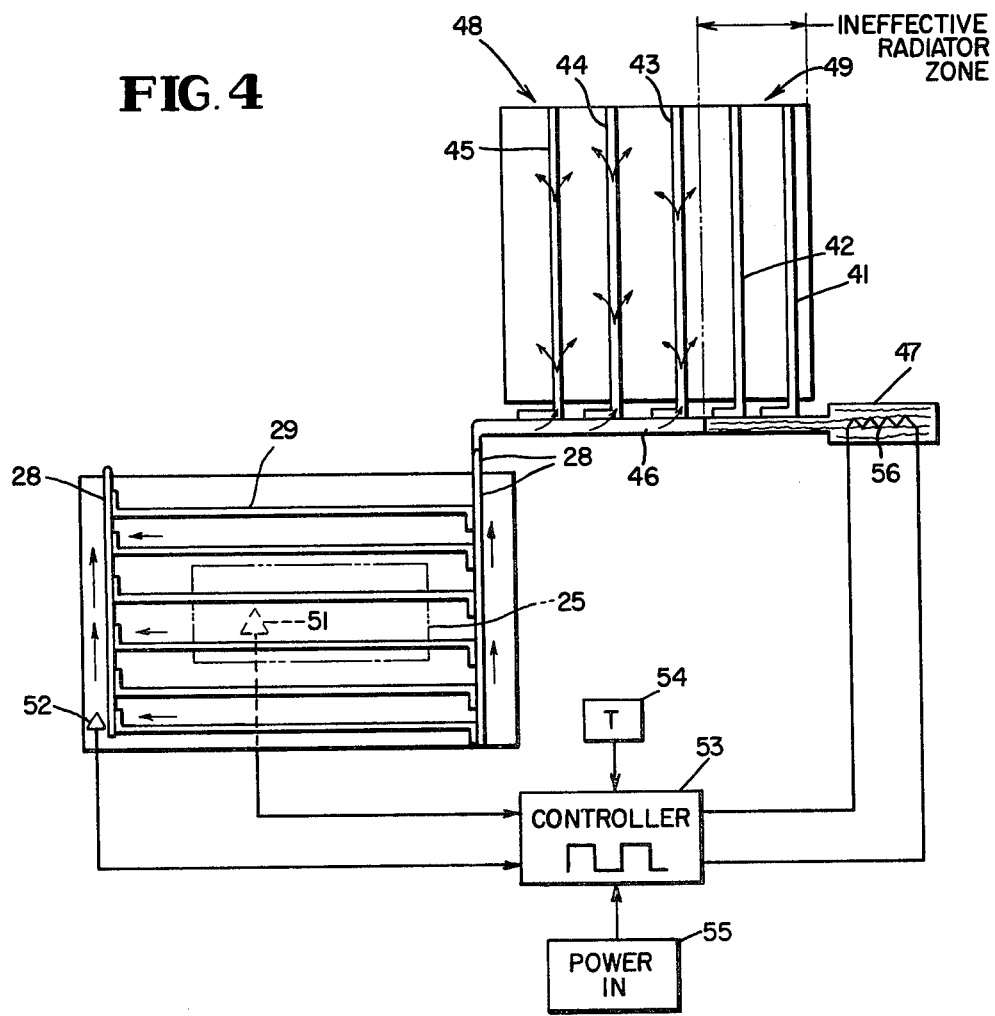

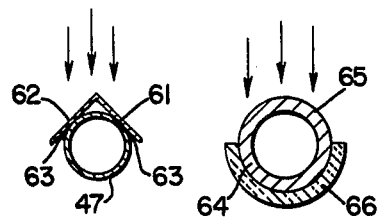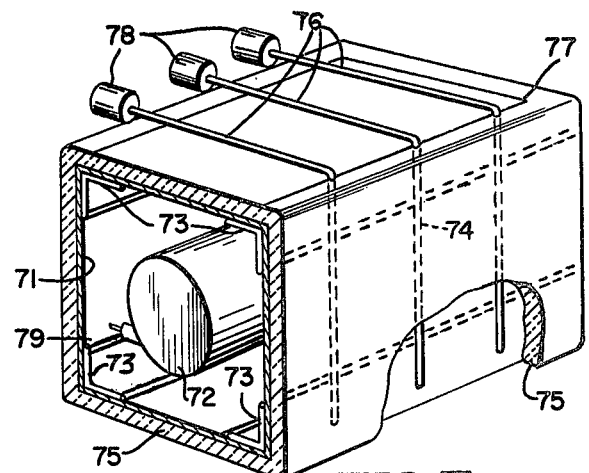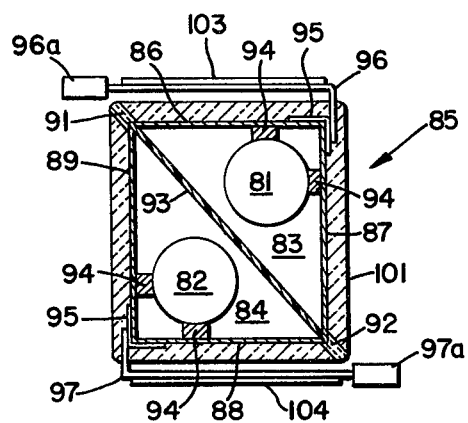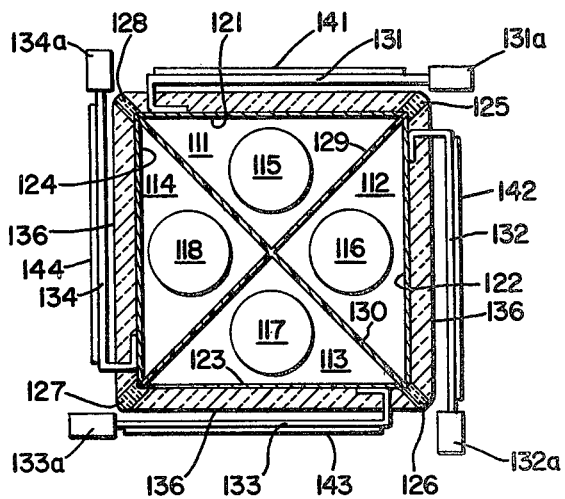
FIG.5  FIG.6  FIG.7
FIG.8  FIG.9

THERMAL CONTROL CANISTER

ORIGIN OF THE INVENTION

The invention described herein was made by an employee of the United States Government and may be manufactured and used by or for the Government for governmental purposes without the payment of any royalties thereon or therefor.

BACKGROUND OF THE INVENTION

The present invention relates generally to an apparatus for maintaining a heat dissipating load at a substantially constant temperature, and more particularly to such an apparatus wherein variable conductance heat pipes effectively control the radiating area of a radiator.

It is desirable in many situations to maintain a heat dissipating load at a set point temperature that can be controlled over a relatively wide range. For example, in certain spacecraft missions, such as the shuttle, there are certain experiments which must be maintained at substantially constant temperatures regardless of the temperature of the spacecraft or its external environment. In the shuttle, such instruments are required to fit within a maximum envelope of 1 m × 1 m × 3 m, and all of the experiments within this envelope must be maintained to a temperature of ±1° C., over a variable set point temperature within the range of 0° to 30° C. A system for maintaining the instrument package to within this range must have a capability of rejecting 300 watts of heat. The stated temperature range must be maintained even though the spacecraft is in many different environments having different heating effects on the instrument envelope. For example, the spacecraft may be exposed to the sun, or it may be in the dark, or it may be re-entering the atmosphere of earth, at which time the spacecraft skin temperature increases to almost 100° C.

Three thermal control concepts have been previously proposed to control the temperature of the instrument envelope. These are:

(1) a heated envelope with thermostat control,
(2) a fluid loop with radiators, and
(3) a heat pipe system.

Feasibility studies indicated that the heat pipe system appears to be the most promising approach to maintain the instrument envelope to the required temperature. It was found that the fluid loop system places an additional burden on a heat rejection system of the spacecraft. In addition, to couple the fluid loop system into the system involves the use of complex interfaces, such as heat exchangers, pumps, and rotary joints. The use of a heated canister with thermostatic control requires a significant amount of power.

Heat pipes are thermodynamic devices employing the latent heat of evaporation of a fluid and wicking system to transport large quantities of heat with small temperature differences between opposite ends of a tube. Heat applied to one end (frequently referred to as the evaporator) of the pipe vaporizes a fluid that flows to the other, cold end of the pipe. At the cold end (frequently known as the condenser) the vapor is condensed causing heat to flow out of the pipe. The condensed liquid returns to the hot end of the pipe via a wick, without the aid of gravity, by capillary forces in the wick. In outer space applications, where there is no gravity, this feature makes the heat pipe ideal for temperature control. The heat pipe containers and wicks are usually made of aluminum and stainless steel, while the vaporizable fluids are usually ammonia or freon. This basic, or conventional heat pipe is known as a fixed conductance heat pipe.

A variation of the fixed conductance heat pipe is a variable conductance heat pipe. The variable conductance heat pipe contains a non-condensable gas which occupies a portion of the cold end of the heat pipe and enables the heat flow to be modulated. In response to an increase in heat at the evaporator end of the heat pipe, the vapor pressure increases to force the noncondensible gas back into a reservoir at the condenser end of the heat pipe. The decrease in gas volume in the condenser exposes a greater portion of the condenser section of the heat pipe, so that a greater quantity of heat is removed from the total system. Conversely, when the heat at the evaporator end of the heat pipe is decreased, the gas in the reservoir extends farther into the condenser end of the heat pipe to occupy a greater portion of the condenser to make it ineffective for heat transfer. The reservoir enables the device to function as a variable heat pipe to compensate for changes in the amount of heat at the evaporator end of the heat pipe and to maintain a substantially constant temperature at the evaporator end of the heat pipe.

A modification of the variable conductance heat pipe is known as the feedback variable conductance heat pipe. In the feedback variable conductance heat pipe, a reservoir of noncondensible gas is provided at the condenser end of the heat pipe. However, a heater is placed in the gas reservoir to vary the volume of the non-condensable gas within the condenser in response to a temperature sensor at the evaporator end of the heat pipe. In response to the sensor detecting a drop in temperature, the heater is activated to cause the gas in the reservoir to expand into the condenser to decrease the area of the condenser end of the heat pipe. The decrease in area of the condenser end of the heat pipe enables the temperature in the evaporator section of the heat pipe to increase. An opposite situation occurs in response to a higher temperature being sensed in the evaporator section of the heat pipe. The feedback variable conductance heat pipe provides better control for the temperature of a load coupled to the evaporator section of the heat pipe than the conventional, variable conductance heat pipe.

It has been previously reported how fixed and variable conductance heat pipes can be utilized to control the temperature of an instrument envelope, referred to as an instrument canister, to a temperature of 20° C.±1° C. In particular, the canister sidewalls are isothermalized by a system of longitudinal and circumferential heat pipes that reject heat to a radiator via variable conductance heat pipes which effectively vary the radiating area of the radiator. The canister walls are provided with fixed conductance heat pipes, which are in heat exchange relationship with variable conductance heat pipes mounted on the radiator. The canister walls and the radiator are separated by a thermal insulating blanket, with heat exchange being provided by members at spaced locations under the blanket. A heater in the reservoir is controlled in response to either the temperature of the canister wall or the temperature of the instrument to effectively vary the radiating area. It was also previously reported that the system is able to shut down during adverse periods, such as re-entry where heat soak back occurs, by activating the reservoir heater on command and forcing gas into the heat pipe, to prevent the radiators from transferring heat from the hot walls of the spacecraft back into the instrument package.

The prior art system was found to have certain disadvantages. In particular, it was capable of operation only around a set point within the vicinity of 20° C., and attempts to control the set point over a range of 0° to 30° C. were not possible. In addition, it was found that variable conductance heat pipe headers between the canister and radiators with isothermalizer heat pipes on the radiators had a number of disadvantages, as follows:

(1) rapid freeze-out of the fluid in the isothermalizers, (2) poor thermal coupling between the canister and heat rejecting surfaces, an important factor when attempting to control the canister temperature to a low set point in a warm environment, (3) poor redundancy because the header design requires one variable conductance heat pipe to operate correctly; but if redundancy is necessary, two variable conductance heat pipes are necessary, and (4) poor ground testability because the header concept requires feeder pipes to be at right angles to the header pipes, resulting in a difficult, if not impossible configuration for ground tests in the heat pipe mode.

With regard to the poor redundancy disadvantage, it is noted that if either of the variable conductance heat pipes required for redundancy develops a small leak, resulting in a gas loss, excessive radiator area would be active and the desired control would not be achieved.

SUMMARY OF THE INVENTION

In accordance with one aspect of the invention, the reason why the prior art device could operate only over a narrow range was found to be that the reservoir of the variable conductance heat pipe has a tendency to be heated by radiation directed onto it from the skin of the spacecraft, as well as from energy reflected from bays included within the spacecraft. By placing a radiation reflector in a path between the radiation source and the reservoir, such radiation does not reach the reservoir and the set point can be varied over the relatively wide range of 0° to 30° C. To this end, the reservoir is provided with reflecting surfaces that face the spacecraft skin and the bays. In addition, a quantity of non-condensable gas is introduced into the reservoir so that the condenser is fully blocked at substantially zero degrees centigrade and the coldest sink temperature. This effectively breaks the conduction path between the fixed and variable conductance heat pipes.

The disadvantages associated with the variable conductance heat pipe headers between the canister and radiators with isothermalizer feed pipes on the radiators and canisters are overcome by locating variable conductance heat pipe feeder pipes in a thermal blanket between the canister and radiator so that there is direct heat transfer by the variable conductance heat pipe feeder pipes between the canister and radiators. The variable conductance heat pipe feeder design is superior to the variable conductance heat pipe header design for a number of reasons, viz.: p (1) the feeder design does not suffer from rapid freeze-out of fluid in isothermalizers;

(2) the feeder pipe design has superior thermal coupling between the canister and heat rejection surfaces to enable lower set points to be achieved in warm environments;

(3) the variable conductance heat pipe feeder design provides automatic compensation if gas is lost from one of the variable conductance heat pipes because the other variable conductance heat pipes compensate. If there is enough leakage to cause a significant loss of fluid in the header design, there is a decreased heat pipe capability, while in the feeder pipe design, the remaining variable conductance heat pipes compensate for the leakage. Because the heat pipes of the feeder design do not have to be at right angles to header pipes for the noncondensible fluid, the feeder design is easier to test under terrestrial conditions.

It is accordingly an object of the present invention to provide a new and improved apparatus for maintaining a heat dissipating load at a substantially constant temperature.

Another object of the invention is to provide a new and improved apparatus for controlling the temperature of an instrument envelope of a spacecraft.

A further object of the invention is to provide a heat pipe system for maintaining the temperature of a load substantially constant.

An additional object of the invention is to provide a new and improved apparatus for enabling the temperature of an instrument packet of a spacecraft to be maintained constant with a heat pipe apparatus, wherein a set point value for the temperature can be varied over a relatively large range.

Yet another object of the invention is to provide a new and improved variable conductance heat pipe apparatus for maintaining a load in an instrument packet or canister relatively constant, without dangers associated with rapid freeze-out of fluid in an isothermizer heat pipe.

Still an additional object of the invention is to provide a variable conductance heat pipe apparatus having improved thermal coupling between a canister for a load and heat rejecting surfaces.

Yet a further object of the invention is to provide a heat pipe apparatus for maintaining the temperature of a load in an instrument packet substantially constant, wherein the heat pipe apparatus indirectly has redundancy characteristics in the event of a failure to one of the variable conductance heat pipes.

Yet an additional object of the invention is to provide a variable conductance heat pipe apparatus for an instrument package of a spacecraft, wherein the heat pipe apparatus is easily tested on the ground.

The above and still further objects, features and advantages of the present invention will become apparent upon consideration of the following detailed description of several specific embodiments thereof, especially when taken in conjunction with the accompanying drawings.

BRIEF DESCRIPTION OF THE DRAWINGS

FIG. 3 is a side view of the canister illustrated in FIG. 2;

FIG. 4 is a schematic diagram of the heat pipe system employed in the present invention;

FIGS. 5 and 6 are side sectional views of two embodiments of an improved reservoir structure adapted to be utilized with the canister configuration of FIG. 3; and FIGS. 7-9 are perspective and side sectional views of different embodiments of the invention wherein a variable conductance heat pipe extends through an insulating blanket to be in heat exchange relation with portions of radiators and walls of a canister that holds instruments to be maintained at differing constant temperatures.

DETAILED DESCRIPTION OF THE PREFERRED EMBODIMENTS

Figure 1:
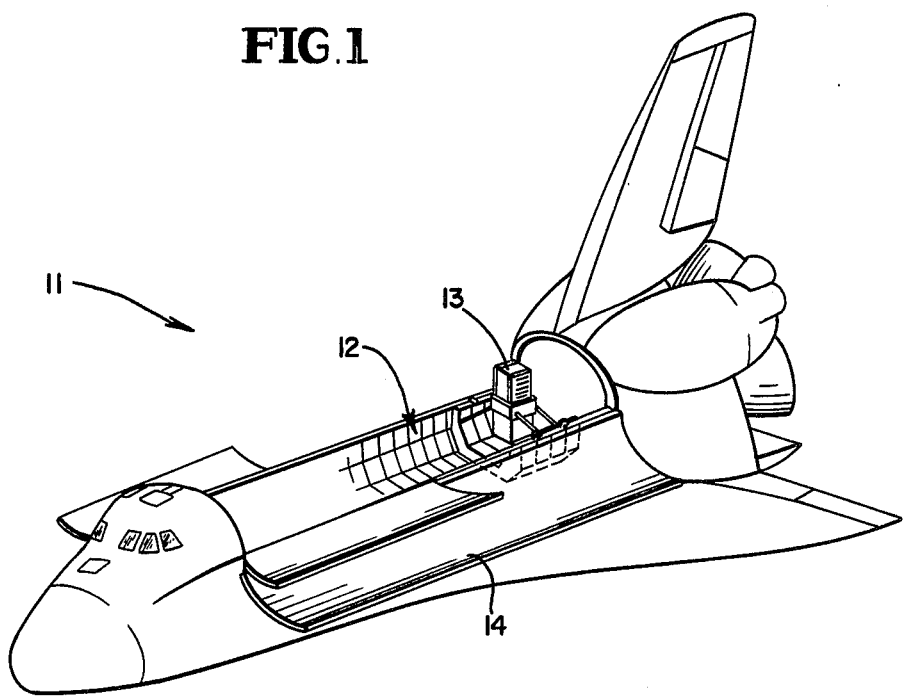
FIG. 1 is a perspective view illustrating the manner in which a thermal canister that is maintained at a constant temperature in accordance with the present invention is located on one particular spacecraft.

Reference is now made to FIG. 1 of the drawing wherein a spacecraft 11, with a configuration known as the space shuttle, includes a mid-bay section 12 in which various instrument packages are located. One of the instrument packages in bay section 12 is a canister 13, which houses various electronic and other components that generate heat. These components must be maintained at a relatively constant temperature of ±1° C., at a selected setpoint value over a range from 0 to 30° C. During take-off and re-entry, bay 12 is separated from the environment surrounding the spacecraft by activating doors 14 to a closed position. When spacecraft 11 is in orbit, doors 14 are opened so that canister 13 is subjected to the cold, black body environment of outer space. However, canister 13 can be exposed to considerable heat while doors 14 are open because of direct solar heating of the canister, as well as because of reflections of radiant energy from the interior of bay 12 onto the exterior of canister 13. During re-entry, while doors 14 are closed, frictional heating of the doors may cause the interior of bay 12 to reach a temperature on the order of 100° C.

Figure 2:
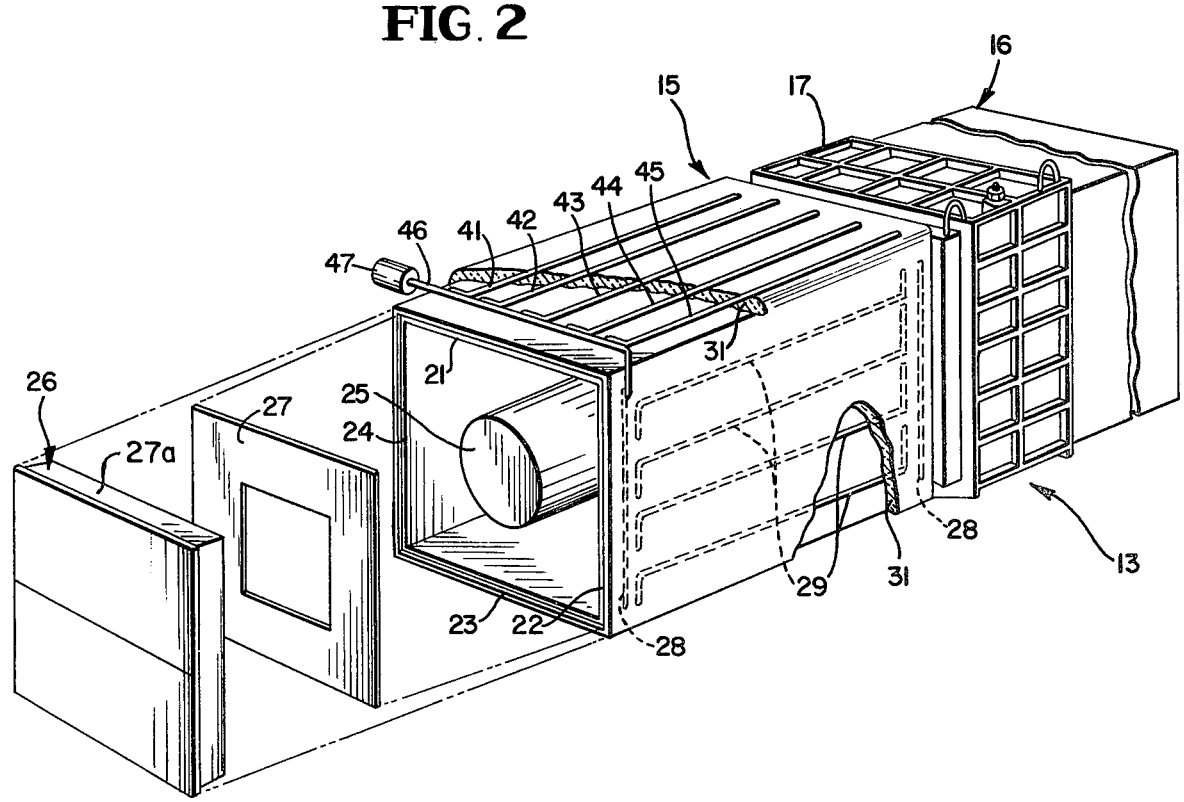
FIG. 2 is an exploded, perspective view of a canister that is cooled in accordance with the invention.

As illustrated in FIG. 2, canister 13 includes two sections 15 and 16, formed as right parallelpipeds and having aligned longitudinal axes. Sections 15 and 16 are mechanically and electrically connected together by a frame 17 that includes electrical connectors. Identical heat pipe systems are provided to maintain sections 15 and 16 at substantially the same, constant, settable temperatures. Because the heat pipe systems for sections 15 and 16 are the same, the heat pipe system for section 15 only is described. It is to be understood, however, that the same heat pipe system is provided for canister 16, and that sections 15 and 16 are linked together conductively through frame 17.

As illustrated in FIGS. 2 and 3, canister section 15 includes four longitudinal metal walls 21-24 at mutually right angles. Walls 21-24 are interconnected with each other at the corners of canister section 15 to form a complete enclosure of heat generating instruments 25 located within the canister section. The enclosure for canister section 15 is completed by providing metal door assembly 26 at the open end of the section. Door assembly 26 includes a pair of parallel panels 27 and 27a fabricated of a material having relatively low thermal conductivity.

Mounted on the periphery of walls 21-24 is a system of conventional heat pipes i.e., heat pipes having hot and cold ends, a vaporizable fluid, and a wicking structure, but without reservoirs as exist in the variable conductance heat pipes and the feedback variable conductance heat pipes. The heat pipes mounted on walls 21-24 are classified as transfer pipes 28 and isothermalizer pipes 29. Transfer pipes 28 are positioned on walls 21-24, at right angles to the longitudinal axis of canister 15, in proximity to the two ends of the canister. Isothermalizer heat pipes 29 extend between transfer heat pipes 28 and run longitudinally of canister 15. Heat pipes 29 have ends in heat exchange relationship with heat pipes 28, but there is no fluid flow between the isothermalizer and transfer heat pipes. Because walls 21-24 are made of a material having a relatively high thermal conductivity, such as honeycomb or aluminum plates, and the walls are bolted together, the walls are in close thermal heat transfer relation with each other. Thermal communication between walls 21-24 is also established by transfer heat pipes 28, interconnected with each other at the edges between walls 21-24.

Surrounding walls 21-24, as well as heat pipes 28 and 29, is a thermal insulator 31, preferably of a type employing multiple layers of aluminized Kapton.

On the portion of insulator 31 that is in the field of view of the outer space environment through which spacecraft 11 is traversing, i.e., the portion of insulator 31 directly above wall 21, there is located a thermal radiator 32, in the form of an aluminum sheet. Traversing and embedded in radiator 32 are a number of heat pipes 41-45, that extend parallel to the longitudinal axis of canister section 15. While five heat pipes are shown as embedded in radiator 32, it is to be understood that in actuality there may be more such heat pipes embedded in the radiator.

Heat pipes 41-45 are mechanically connected to feedback variable conductance heat pipe 46 so that pipes 41-45 are in heat exchange with pipe 46, but no fluid flow is provided from pipes 41-45 to pipe 46, or vice versa. Pipe 46 extends through insulation layer 31, to be in mechanical and heat transfer contact with transfer pipes 28 (but not in fluid-flow relation) at the edge of canister section 15 defined by the intersection of walls 21 and 22. Heat pipe 46 functions as a header to establish a heat exchange relationship between transfer pipes 28 and a selected number of heat pipes 41-45. The number of heat pipes 41-45 in heat exchange relationship with transfer pipes 28 is determined by the volume of gas extending from a gas reservoir 47, at the condenser end of heat pipe 46. The gas in reservoir 47 flows down a length of heat pipe 46 to control the effective heat exchange length of heat pipe 46.

As the gas in reservoir 47 expands, an increasing length of heat pipe 46 is filled with the gas which blocks the flow of heat from the heat pipe 46 to heat pipes 41-45, having ends adjacent the portion of heat pipe 46 that is filled with the gas. In the illustrated configuration, the ends of heat pipes 41 and 42 are adjacent the portion of heat pipe 46 that is filled with gas, while the ends of heat pipes 43-45 are in heat transfer communication with a portion of heat pipe 46 that is not filled with the gas. Thereby, heat pipes 41 and 42 are not in heat exchange relationship with the vaporizable fluid that flows through the remainder of heat pipe 46, while heat pipes 43-45 are in indirect communication with this fluid.

Hence, heat transfer is provided from heat pipes 28 to heat pipes 43-45 at the edge of canister section 15 adjacent the intersection of walls 21 and 22. Heat is therefore radiated from instrument 25 to walls 21-24 and flows from the walls to isothermalizer heat pipes 29. From heat pipes 29, heat flows to transfer heat pipes 28 and thence to the portion of feedback variable conductance heat pipe 46 that is not occupied by gas from reservoir 47. The heat that flows into heat pipe 46 from transfer pipe 28 flows into heat pipes 43-45, but not into heat pipes 41 and 42. Thereby, area 48 of radiator 32 over heat pipes 43-45 is effective to remove heat from instrument 25, while portion 49 of the radiator over heat pipes 41 and 42 is not effective to remove heat from instrument load 25.

The effective radiating area of radiator 32 is controlled as a function of the temperature of instrument 25 or the temperature of one of the walls of canister section 15. As the temperature of the instrument or of the wall varies, the volume of gas in heat pipe 46 increases and decreases to control the effective radiation area of radiator 32. To these ends, a temperature sensor, such as a thermistor 51 or 52, is either on the wall of instrument 25 or on a wall, such as wall 24, of canister 15.

A signal from one of the temperature sensors is coupled to a conventional on-off thermostat within controller 53 that is also responsive to a temperature set point level change signal, as derived from source 54. The set point level change derived from source 54 can be variable over a relatively wide range, from 0° C. to 30° C., in accordance with the invention. Controller 53 responds to the set point level change signal from source 54 and the signal from one of sensors 51 or 52 to derive an error signal that controls the application of power from a suitable source, such as DC source 55, to an electric heater 56 that is immersed in reservoir 47.

In response to the sensed temperature from one of sensors 51 or 52 differing from the set point level temperature from source 54, controller 53 is activated to control the flow of current from power source 55 to heater 56. In response to the sensed temperature being greater than the set point temperature, an indication is provided that additional heat must be coupled from instrument 25 to radiator 32. Thereby, controller 53 responds to the sensed and set point temperatures to reduce the power supplied to heater 56, so that the volume of gas occupying the condenser of heat pipe 46 is decreased and an increased effective radiating area for radiator 32 is provided. In response to the opposite situation, additional power is supplied by source 55 to heater 56 and the volume of gas in reservoir 47 and heat pipe 46 is increased, to decrease the effective radiating area of radiator 32.

During re-entry when bay 12 of spacecraft 11 may reach a temperature of 100° C., the temperature of canister 13 is maintained substantially constant, approximately at the setpoint temperature by thermally insulating the canister from the bay. To this end, the effective area of radiator 32 is reduced to zero by increasing the current applied to heater 56 so that all of heat pipes 41-45 are thermally isolated from heat pipe 28 by completely blocking the condenser of heat pipe 46. In this mode, open loop activation of heater 56 is provided so that the heater is responsive to a predetermined current derived from controller 53, and the output of the temperature transducers has no effect on the heater current.

In the past, gas reservoir 47 absorbed a considerable amount of heat from solar radiation impinging directly on it, as well as from solar radiation reflected from the interior of bay 12. The radiation absorption occurred because of the material and external dark color of reservoir 47. The radiation absorption causes the gas in reservoir 47 to be heated extensively, so that the temperature setpoint was virtually invariable, and was required to be set substantially at 20° C.

In accordance with one aspect of the present invention, reservoir 47 is provided with a heat reflector to prevent radiation heating of the gas inside of the reservoir. In one configuration, illustrated in FIG. 5, a pair of aluminum plates 61 and 62 cover the upper, exterior portion of reservoir 47, and are bonded to the reservoir by weld joints 63. Plates 61 and 62 intersect at their top edges, to form a tent-like structure that faces outwardly of bay 12, toward doors 14 when the doors are closed. Plates 61 and 62 are covered with a highly radiation reflective material, such as silverized Teflon steel, so that solar radiation is not absorbed significantly by the fluid in reservoir 47.

The configuration of FIG. 5, however, is relatively expensive to fabricate, and does not provide sufficient shielding of reservoir 47 from solar radiation reflected from the interior of bay 12 against portions of the sides of reservoir 47 or the underneath portion of the reservoir. To obviate this problem, reservoir 47 is formed of a stainless steel cylinder 64, as illustrated in FIG. 6. The stainless steel cylinder is coated with a highly reflective coating 65 on the side facing the sun and reflects solar radiation directed at it through open doors 14. Insulation 66 on all the other surfaces reflects solar radiation from the interior of bay 12 (FIG. 6). It was found that the configuration of FIG. 6 reduced the solar radiation heating of the gas in reservoir 47 to enable the setpoint for the temperature of canister 13 to be variable, anywhere over the relatively wide range of 0° to 30° C.

In accordance with another aspect of the invention, the variable conductance heat pipe header between the canister and radiators is replaced by variable conductance heat pipe feeder pipes located in a blanket between the canister and radiator. FIGS. 7-9 are perspective and side sectional views of embodiments wherein the variable conductance heat pipe feeder pipes are in a thermal blanket between the canister and radiator.

Referring to FIG. 7, a metal canister 71 having a square cross section contains a heat dissipating instrument 72. The exterior, exposed walls of canister 71 are completely covered by a thermal insluating blanket 75, formed of multilayer Kapton blankets. The side of blanket 75 facing the doors of the shuttle is covered by a thermal radiating sheet 77. Transfer pipes 73 are mounted on the inside corners of canister 71 and extend along the length of the canister to draw heat from the central regions of the canister walls toward the corners. Extending transversely to the length of canister 71 are spaced separate feedback variable conductance heat pipes 74, each having a first portion that is embedded in radiator 77 and a second part that extends along the exterior of a wall of canister 71 at right angles to the plane of radiator 77. These two portions of heat pipes 74 are interconnected by an additional portion of the heat pipe which extends through the corner of blanket 75. Fluid reservoirs 78 for variable conductance heat pipes 74 are located at the ends of pipes 76 that are outside of the blanket 75 . Extending along the exterior length of canister 71 are isothermilizer heat pipes (not shown), similar to heat pipes 29, FIG. 2; similar, longitudinally extending heat pipes are provided in FIGS. 8 and 9.

The effective radiating area of radiator 77 is controlled in response to the temperature of instrument 72 or the temperature on wall 71. To this end, a temperature sensor 79 is fixedly mounted on instrument 72 (a similar sensor can be mounted on the wall of canister 71) to control the temperature of gas in reservoir 78 in the manner described supra in connection with FIG. 4. As the temperature of the gas in reservoir 78 increases, there is a decreased effective heat transfer area along the length of heat pipes 74 and radiator 77, to decrease the effective radiation area of radiator 77. Heaters (not shown) in reservoirs 78 may be ganged together to operate from a single error signal from sensor 79.

A number of instruments can be controlled to separate setpoint temperatures in a single canister, as illustrated in the embodiments of FIGS 8 and 9. In the embodiment of FIG. 8, a pair of instrument packages 81 and 82 are located in separate, thermally insulated compartments 83 and 84 of canister 85. Canister 85 includes metal walls 86–89 arranged so that walls 86 and 87 intersect each other at a diametrically opposite edge from the intersection of walls 88 and 89. The edge between walls 86 and 89 is formed by a heat insulating wedge 91 and a similar wedge 92 is provided at the diametrically opposed corner, between walls 87 and 88. Extending between wedges 91 and 92 is a heat insulating layer 93 which functions as a common boundary for compartments 83 and 84. Instrument packages 81 and 82 are mounted in compartments 83 and 84 by metal, high thermal conductivity blocks 94 which are connected to the walls of canister 85 approximately ⅓ of the distance along the two diametrically opposed edges where walls 86 and 87 join and where walls 88 and 89 intersect.

At the intersection edges for walls 86 and 87 and walls 88 and 89, transfer heat pipes 95, similar to heat pipes 73 (FIG. 7) are provided. Heat pipe 96 associated with compartment 83 has a gas reservoir 96a having a gas volume controlled through a heater (not shown) by the temperature of instrument 81 or the temperature of wall 86 or 87. Similarly, the volume of a gas reservoir 97a for heat pipe 97 is controlled through a heater (not shown) by the temperature of walls 88 or 89. Surrounding walls 86–89 is a thermal insulating blanket 101, similar to blanket 75, FIG. 7. The ends of heat pipes 96 and 97 remote from reservoirs 96a and 97a extend through blanket 101 to be in heat exchange contact with transfer pipes 95. It may be desirable to exclude wedges 91 and 92 and replace them with an insulation blanket and merely connect the interior edges of the wedges with a solid low thermal conductivity element that is surrounded by blanket 101.

The temperature within each of compartments 83 and 84 is separately controlled by varying the effective radiating area of each of the compartments. To this end, the exposed, outer portions of heat pipes 96 and 97 are in heat transfer relationship with radiators 103 and 104, respectively. In operation, heat flows from instruments 81 and 82 via metal blocks 94 to walls 86 and 87 of compartment 83 and walls 88 and 89 of compartment 84. The heat in walls 86 and 87 flows to variable conductance heat pipes 96, with the heat in pipe 96 being rejected to space by radiator 103. The effective area of radiator 103 is controlled by the sensed temperature of instrument 81 or the sensed temperature of wall 86 and/or wall 87 equal to a setpoint temperature for compartment 83. Similarly, the heat in walls 88 and 89 flows to heat pipe 97 and the heat in pipe 97 flows to radiator 104 that radiates the heat flowing to it to outer space. The effective area of radiator 104 is controlled by the temperature of instrument 82 or walls 88 and/or 89 and the setpoint temperature for compartment 84. The effective areas of radiators 103 and 104 are controlled by heat pipes 96 and 97 and reservoirs 96a and 97a, respectively, are associated therewith in the manner described in connection with FIG. 4. Separate thermostatic controllers are used for each compartment.

In the embodiment of FIG. 9, four instrument compartments 111, 112, 113, and 114 respectively carry instruments 115, 116, 117, and 118. The outer boundaries of compartments 111–114 are respectively defined by metal walls 121–124, which are thermally insulated from each other by wedges 125–128, at the edges of the canister between adjacent ones of the walls. Extending between diametrically opposed thermal insulating wedges 125–128 are thermal insulating curtains 129 and 130, having a common intersection at the center of the canister and which define interior walls of compartments 111–114. Mounted on each of walls 121–124 is a separate feedback variable conductance heat pipe 131–134, each having its own fluid reservoir, 131a, 132a, 133a and 134a, respectively; the gas volume of which is controlled by a separate temperature sensor for the wall or instrument within the particular compartment. Each of walls 121–124 is covered by a thermal insulating blanket 136, of the type described supra in connection with FIG. 7.

Abutting against heat pipes 131–134 are metal foil radiators 141–144, respectively. The effective radiating area of each of radiators 141–144 is separately controlled in response to temperature sensors mounted on the wall or instrument within each of the compartments. Separate thermostatic controllers are used for each compartment.

While there have been described and illustrated several specific embodiments of the invention, it will be clear that variations in the details of the embodiments specifically illustrated and described may be made without departing from the true spirit and scope of the invention as defined in the appended claims.

What is claimed is:

1. Apparatus for maintaining a heat dissipating load at a substantially constant temperature, comprising:
   a canister having a plurality of walls in close thermal heat transfer relationship for holding said load therein in heat exchange relationship with at least one of said walls;
   a plurality of transfer heat pipes at each end of said canister and in heat exchange relationship with the exterior of each of said walls, said transfer heat pipes having longitudinal axes extending transverse to the longitudinal axis of said canister and having ends thereof in heat exchange relationship with adjacent ends of said transfer heat pipes on adjacent walls;
   a plurality of isothermalizer heat pipes extending between said transfer heat pipes at each end of said canister and in heat exchange relationship with the exterior of said walls and said transfer heat pipes, said isothermalizer heat pipes having longitudinal axes extending parallel to the longitudinal axis of said canister;
   a thermal insulator surrounding the exterior of said walls, said transfer heat pipes and said isothermalizer heat pipes;
   a thermal radiator covering at least one portion of the exterior surface of said thermal insulator;
   a plurality of heat pipes embedded within said thermal radiator having longitudinal axes extending parallel to the longitudinal axis of said canister; and
   at least one feedback variable conductance heat pipe in heat exchange relationship with an end of said heat pipes and having a longitudinal axis transverse to the longitudinal axis of said canister, said feedback variable conductance heat pipe having one end extending inwardly through said thermal insulator and in heat exchange relationship with at least one of said transfer heat pipes at one of said ends of said canister, said variable conductance heat pipe including a reservoir having a noncondensible fluid therein that expands and contracts as a function of temperature for controlling the number of said heat pipes in heat exchange relationship with said feedback variable conductance heat pipe.

2. The apparatus of claim 1, wherein said walls of said canister are formed of a high thermal conductivity material.

3. The apparatus of claim 2 wherein said walls are aluminum.

4. The apparatus of claim 1 wherein said thermal insulator includes multiple layers of aluminized material.

5. The apparatus of claim 1 wherein said reservoir includes a radiation reflector to reflect radiation impinging on said reservoir, said radiation reflector causing said reservoir to have a variable set point temperature.

6. The apparatus of claim 5 wherein said set point temperature is variable over a range of 0 degrees celsius to 30 degrees celsius.

7. The apparatus of claim 6 wherein said reflector includes a pair of aluminum plates connected to said reservoir and in alignment with said radiation.

8. The apparatus of claim 6 wherein said reflector includes:
 a reflective coating on the exterior surface of said reservoir for reflecting said radiation; and
 an insulator surrounding a portion of said reservoir for reflecting said radiation.

9. The apparatus of claim 1 further including:
 a heater within said reservoir for heating said noncondensible fluid;
 a temperature sensor for sensing the temperature of said heat dissipating load;
 controller means coupling said heater and said temperature sensor, said controller means being responsive to a temperature change by said temperature sensor for changing the current to said heater to selectively heat or cool said noncondensible fluid, said noncondensible fluid expanding or contracting in response to said changing current for effectively varying the number of said heat pipes in heat exchange relationship with said feedback variable conductive heat pipe.

* * * * *